United States Patent Office 3,499,750
Patented Mar. 10, 1970

3,499,750
METHOD OF ACCELERATING FRUIT RIPENING
Geoffrey E. Barnsley, Canterbury, Kent, Peter A. Gabbott, Sittingbourne, Kent, and Barry V. Milborrow, Canterbury, Kent, England, assignors to Shell Oil Company, New York, N.Y., a corporation of Delaware
No Drawing. Filed Mar. 6, 1967, Ser. No. 621,074
Claims priority, application Great Britain, Mar. 4, 1966, 9,574/66
Int. Cl. A01n 5/00
U.S. Cl. 71—113       5 Claims

ABSTRACT OF THE DISCLOSURE

Acceleration of fruit-ripening in plants by treating the plants at the time the plant is bearing fruit with 3-methyl-5-(1-hydroxy-4-oxo-2,6,6-trimethyl - 2 - cyclohexen-1-yl)-2,4-pentadienoic acid.

---

In the field of horticulture, there has always been a need for new plant growth regulators. One such area has been for chemicals that accelerate the ripening of commercially important fruit such as olives, cotton (bolls), nuts and the like.

While a chemical such as tributylphosphorotrithioite accelerates fruit ripening to some degree, it is primarily used as a commercial defoliant, especially of cotton. While some degree of defoliation is unobjectionable in a fruit-ripening agent, there are crops where defoliation is not needed. For example, in the growing of olives, the normal harvesting operation involves beating the branches of the tree in order to release the olives. This method causes severe damage which appears to seriously reduce the yield in subsequent seasons. Here as with other crops, there is a need for an agent that will hasten the ripening of fruit and not significantly alter other portions of the plant.

We have now discovered an agent, 3-methyl-5-(1-hydroxy-4-oxo-2,6,6 - trimethyl - 2 - cyclohexen-1-yl)-2,4-pentadienoic acid, that is highly effective as an accelerator of fruit ripening.

OBJECTS

It is an object of this invention to provide a method of accelerating fruit ripening in plants. Another object is to provide a method whereby the fruit ripening is accomplished with no or reduced defoliation of the plant. Still another object is to provide a method of hastening fruit ripening that uses a chemical that has a low mammalian toxicity and leaves low levels of residue. It is yet another object to provide a method whereby the time and labor involved during the harvesting of fruit is reduced.

STATEMENT OF THE INVENTION

These objects are accomplished by a method comprising contacting fruit-bearing plants at the time the plant is bearing fruit with a biologically active amount of 3-methyl-5-(1-hydroxy-4-oxo-2,6,6-trimethyl - 2-cyclohexen-1-yl)-2,4-pentadienoic acid.

A preferred class of fruit-bearing plants are the field crops and those commonly associated with orchards.

FRUIT-BEARING PLANTS AND FRUIT RIPENING AGENT

The fruit-bearing plants include not only what is popularly regarded as fruit, i.e., juicy edible materials such as apples, grapes, pineapples and the like, but also those substances that are considered fruits in the botanical sense, i.e., the matured ovary of a flower. This latter usage includes the fruit of cotton, corn, tomatoes and the like.

Field crops include cotton, peanuts, cabbage, peas, lettuce, onions, carrots, snap beans, cucumbers, spinach, beets, potatoes, artichokes, soybeans, the grains such as wheat, corn, rice, barley, and the like. As is evident, many of these fruit-bearing plants are popularly called vegetables.

The term orchard plant includes those plants which produce what is by common usage considered fruit. This includes plants such as citrus (oranges, grapefruit, limes, lemons, etc.), grapes, apples, peaches, melons, peas, plums, apricots, cherries, strawberries, avocados, cranberries, bush berries, dates, figs, olives, persimmons, pineapples, nuts, such as walnuts, almonds, chestnuts. Most of the fruit comes from trees or shrubs.

The fruit-ripening agent, 3-methyl-5-(1-hydroxy-4-oxo-2,6,6-trimethyl-2-cyclohexen-1-yl)-2,4 - pentadienoic acid may exist in cis or trans configuration with respect to both double bonds in the carbon chain. Moreover, since there is an asymmetric carbon atom present in the compound, optical isomers and racemic mixtures are possible. All isomers and mixtures are within the scope of the present invention. The compound is described in an article by J. W. Cornforth et al. in Nature 206, 715 (1965).

UTILITY

The fruit-ripening agent is applied to the plant at the time the tree is bearing fruit. Preferably the flowering cycle has concluded before the fruit-ripening agent is applied.

Since the fruit-ripening agent is a solid under ordinary conditions and is needed in relatively small amounts, it is preferable to apply it in the form of a solution or dispersion although any method that will assure an equal distribution is suitable. The fruit-ripening agent may be applied in any of the conventional formulations used in the agricultural art for application to the aerial portions of the plant. Thus, the agent may be formulated with a carrier which may be a solid or liquid and may be of synthetic or natural origin to form a composition. Solid carriers may comprise clays, silicates, synthetic hydrated silicon oxides, resins, waxes, synthetic polymeric materials or elemental substances. Examples of liquid carriers are water, alcohols, ketones, aromatic hydrocarbons, chlorinated hydrocarbons, suitable petroleum fractions, and dimethylsulphoxide.

Surface active agents, stabilizers, fertilizers and/or certain biologically active materials may be incorporated in the compositions of the invention. The compositions of the invention may be formulated as wettable powders, dusts, granules, concentrates, solutions, emulsifiable concentrates or conventional emulsions.

When solution, emulsions, dusts, etc., are used as carriers in preparing formulations, the concentration of the accelerating agent is usually in the range of 0.0001–75% by weight, preferably 0.01%–50% by weight of the formulation. The concentration of the solution will depend somewhat on the mode of application, i.e., spraying, immersion, dusting, etc., since the actual amount delivered to the plant varies with the mode of application.

The minimum amount of accelerating agent necessary to accelerate the ripening of the fruit is defined as a biologically active amount. The particular concentration for each variety of fruit-bearing plant will depend on many conditions such as the particular plant, degree of acceleration desired, mode of application, i.e., formulation used, weather conditions and the like. By the use of controls, for example, those skilled in the art can readily determine the optimum concentration needed to accelerate fruit-ripening for the particular plant.

Another reason for determining the optimum concentration of accelerating agent for each plant is the tendency of the agent to accelerate defoliation in plants. The defoliation can, however, be kept to a minimum or insignificant amount by the use of minimum concentrations of the accelerating agent needed for fruit ripening. For example, the fruit-ripening agent of the invention enhances the rate of ripening of cotton bolls at dosage rates which give only low levels of defoliation. Contrariwise, tributylphosphorotrithioite, a commercial defoliant, requires dosages that result in degrees of defoliation in cotton of about 90% to achieve a similar ripening effect as the agent of this invention.

The compositions of the invention, methods for their preparation and the invention concept of accelerating fruit ripening are all illustrated by the following examples.

EXAMPLE I

Preparation of a wettable powder

3 - methyl - 5 - (1 - hydroxy - 4 - oxo - 2,6,6 - trimethyl-2 - cyclohexen - 1 - yl) - 2,4 - pentadienoic acid (25% w.), Tamol 731 (3% w.), Empicol LZ (2% w.) and Clay GTY (70% w.) (Tamol 731 is a polymethylacrylate anionic surfactant, Empicol LZ is sodium lauryl sulphate; and Clay GTY is powdered hydrated aluminium silicate, a kaolinite china clay) were blended and hammer milled, followed by air milling and finally reblended to give a wettable powder of small particle size.

EXAMPLE II

Preparation of a wettable powder

3 - methyl - 5 - (1 - hydroxy - 4 - oxo - 2,6,6 - trimethyl-2 - cyclohexen - 1 - yl - )2,4-pentadienoic acid (50% w.), Tamol 731 (3% w.), Empicol LZ (2% w.) Florisil (22.5% w.), silicum dioxylol No. 3 (22.5% w.) (Florisil is attapulgite of Spanish origin and silicum dioxylol No. 3 is a highly sorptive synthetic silicate) were blended and hammer milled, followed by air milling and finally reblended to give a wettable powder of small particle size.

EXAMPLE III

Preparation of a solution

3 - methyl - 5 - (1 - hydroxy - 4 - oxo - 2,6,6 - trimethyl-2 - cyclohexen - 1 - yl) - 2,4 - pentadienoic acid (10% w.), Tensiofix AS (5% w.) Tensiofix D120 (5% w.), N-methyl-pyrrolidone/methylcyclohexanone 50/50 (to 100% v.) (Tensiofix AS is a mixed blend of two nonionic polyethylene condensates and an anionic alkylsulphonate; Tensiofix D120 is an ethylene oxide condensate with castor oil) were blended and dissolved in the solvent mixture at a temperature of up to 40° C. maximum. The solution may be filtered where necessary.

EXAMPLE IV

Fruit ripening of olives

Four olive trees were selected for the test. Three were treated with solutions containing varying amounts of 3-methyl - 5 - (1 - hydroxy - 4 - oxo - 2,6,6 - trimethyl - 2 - cyclohexen-1-yl)-2,4-pentadienoic acid and one was used as control. A 10% acetone in water spray mixture was used and this was applied at the rate of 2 liters per tree.

After spraying, the trees were visited each day for six days and the "fruit drop" was collected, graded (green and black) and the total weight recorded. On the 7th, 8th, and 9th days the trees were each given a light shake before collecting, grading and weighing. On the 10th, 11th and 12th days the trees were given a heavy shake before collecting, grading and weighing. Twenty-eight days after spraying all the olives remaining were collected and/or harvested to obtain a measure of total yield per tree.

At no time during the trial were phytotoxic symptoms found on the leaves or fruit, but four days after application the trees treated with 300 mg. and 600 mg. of 3-methyl - 5 - (1 - hydroxy - 4 - oxo - 2,6,6 - trimethyl - 2 - cyclohexen-1-yl)-2,4-pentadienoic acid suffered a premature leaf fall. This leaf fall did not, however, reach the proportions which were observed with the normal harvesting operations.

It should be noted that the degree of leaf fall (defoliation) was nonexistent or slight at the low dosage rates of 3-methyl-5-(1-hydroxy - 4-oxo-2,6,6-trimethyl-2-cyclohexen-1-yl)-2,4-pentadienoic acid. Furthermore, at these levels the degree of fruit ripening as evidenced by the fruit drop was up to 4 times that of the control.

TABLE 1.—WEIGHT OF OLIVE DROP AFTER TREATMENT

| Plot No. | Dose rate, mg./tree of 3-methyl-5-(1-hydroxy-4-oxo-2,6,6-trimethyl-2-cyclohexen-1-yl)-2,4-pentadienoic acid | Drop without shaking for 6 days after treatment | Light shaking for 3 days | Heavy shaking for 3 days | Accumulative total weight of olive drop 12 days after treatment 25th Oct. | Increase in leaf fall compared with control 12 days after treatment 25th Oct. | Weight of olive drop collected 23 days after treatment 5th Nov. | Accumulative total weight of olive drop 23 days after treatment 5th Nov. | Increase in leaf fall compared with control 28 days after treatment 5th Nov. |
|---|---|---|---|---|---|---|---|---|---|
| 1 | 150 | 284 | 280 | 652 | 1,216 | None | 520 | 1,736 | None. |
| 2 | 200 | 262 | 148 | 382 | 792 | Some | 360 | 1,152 | No further fall since 25th Oct. |
| 3 | 600 | 228 | 132 | 298 | 658 | Marked | 248 | 906 | Some. |
| 4 | Control | 110 | 60 | 142 | 312 | | 306 | 618 | |

EXAMPLE V

Acceleration of fruit ripening and defoliation in mature cotton

Cotton plants (variety Black Sudan) were raised in pots in the glasshouse and treated by dipping leaves in aqueous suspension of 3-methyl-5-(1-hydroxy-4-oxo 2,6,6-trimethyl-2-cyclohexen - 1 - yl)-2,4-pentadienoic acid or tributylphosphorotrithioite at the closed green boll stage. Leaf fall was recorded in the ensuing month for these plants and others treated as controls. All plants were watered daily for three weeks after treatment, but then no further water was supplied until the end of the experiment.

The results are summarized in Table 2.

TABLE 2.—ACCELERATION OF FRUIT RIPENING AND DEFOLIATION IN MATURE COTTON

| Treatment (All Leaves Dipped) | Active Material, p.p.m. | Number of Days After Treatment | | | | | |
|---|---|---|---|---|---|---|---|
| | | 5 | 8 | 11 | 21 | 23 | 28 |
| | | Percentage Defoliation | | | | | |
| 3-methyl-5-(1-hydroxy-4-oxo-2,6,6-trimethyl-2-cyclohenen-1-yl)-2,4-pentadienoic acid. | 1,000 | 21 | 59 | 63 | 65 | 79 | 97 |
| | 100 | 1 | 10 | 14 | 20 | 39 | 63 |
| | 10 | 1 | 1 | 15 | 29 | 43 | 59 |
| Tributylphosphorotrithioite | 1,000 | 0 | 0 | 0 | 19 | 28 | 64 |
| Blank solvent (1:1 v.v. acetone/water) | 0 | 0 | 0 | 0 | 3 | 6 | 12 |

While this example demonstrates that the fruit-ripening agent of the invention may act as a defoliant, observations during the experiment showed that at comparable levels of defoliation, e.g., 3-methyl-5-(1-hydroxy-4-oxo-2,6,6-trimethyl-2-cyclohexen-1-yl)-2,4-pentadienoic acid at 100 p.p.m. and tributylphosphorotrithioite at 1000 p.p.m. the 3-methyl-5-(1-hydroxy-4 - oxo - 2,6,6-trimethyl-2-cyclohexen-1-yl)-2,4-pentadienoic acid had induced a greater proportion of bolls to open, i.e., had accelerated the ripening of the cotton fruit, at the 28th day of treatment.

EXAMPLE VI

Thirty-five thirteen-year-old olive trees were selected for uniformity of size, and grouped into 7 blocks each of 5 trees.

Within each block, the treatments were applied randomly and consisted of:

(i) Spray solvent only, onto 2 trees
(ii) Spray solvent containing 20 mg. 3-methyl-5-(1-hydroxy-4-oxo-2,6,6-trimethyl - 2 - cyclohexen-1-yl)-2,4-pentadienoic acid on 1 tree
(iii) Spray solvent containing 60 mg. 3-methyl-5-(1-hydroxy-4-oxo-2,6,6-trimethyl - 2 - cyclohexen-1-yl)-2,4-pentadienoic acid on 1 tree Using a knap-sack mist blower, each tree was treated either with the spray solvent olen (consisting of 50 ml. of acetone, 6 ml. Triton X-100 wetting agent, and 2000 ml. of water), or with the appropriate solution of 3-methyl-5-(1-hydroxy-4-oxo-2,6,6-trimethyl - 2-cyclohexen-1-yl)-2,4-pentadienoic acid in that solvent.

Treatment applications were made 3 weeks prior to the forecasted olive harvesting date, and those olives which had dropped from the trees over the period from Day 4 to Day 6 after treatment, were weighed. In the Table 3 below, the treatment mean weights of dropped olives are given. These mean weights have been adjusted to take into account the total weights of olives on the trees at the time of spraying, and standard errors of the means are given in parentheses, together with the statistical significance of the difference over the control where appropriate.

TABLE 3

| Treatment 3-methyl-5-(1-hydroxy-4-oxo-2,6,6-trimethyl-2-cyclohexen-1-yl)-2,4-pentadienoic acid, mg./tree | Mean wt. (in gms.) Collected Between 4th and 6th Day |
|---|---|
| 20 | 431 ($\pm$46.1) |
| 60 | 620 ($\pm$46.1, $p = <.01$) |
| 0 i.e., blank spray control | 448 ($\pm$32.6) |

3-methyl-5-(1-hydroxy-4-oxo - 2,6,6-trimethyl-2-cyclohexen-1-yl)-2,4-pentadienoic acid was also applied in a similar series of treatments at date 2 weeks and 1 week prior to the expected harvest date, but the most significant results were those obtained from the 3 week application. However, the actual harvest was carried out about a week earlier than expected, and therefore the results actually represent the effects achieved on spraying 1 and 2 weeks prior to harvest. Since the earlier application yielded the most significant increase in fruit drop, there is a clear possibility that applications at an even earlier date would produce even larger effects.

We claim:

1. The method of accelerating fruit ripening comprising contacting a fruit-bearing plant at the time the plant is bearing fruit with an effective amount of 3-methyl-5-(1-hydroxy-4-oxo-2,6,6-trimethyl - 2-cyclohexen - 1-yl)-2,4-pentadienoic acid.

2. The method of claim 1 wherein the fruit-bearing plant is a field crop.

3. The method of claim 1 wherein the fruit-bearing plant is an orchard plant.

4. The method of claim 3 wherein the orchard plant is an olive tree.

5. The method of claim 2 wherein the field crop is cotton.

References Cited

Ohkuma et al., Science, vol. 142, pp. 1592 and 1593, 1963.

JAMES O. THOMAS, JR., Primary Examiner

U.S. Cl. X.R.

71—70